United States Patent
Hauk et al.

(10) Patent No.: US 7,288,236 B2
(45) Date of Patent: Oct. 30, 2007

(54) PROCESS FOR THE PREPARATION OF LITHIUM BOROHYDRIDE

(75) Inventors: Dieter Hauk, Friedberg (DE); Ulrich Wietelmann, Friedrichsdorf (DE)

(73) Assignee: Chemetall GmbH, Frankfurt (DE)

( * ) Notice: Subject to any disclaimer, the term of this patent is extended or adjusted under 35 U.S.C. 154(b) by 83 days.

(21) Appl. No.: 10/760,707

(22) Filed: Jan. 20, 2004

(65) Prior Publication Data
US 2005/0074385 A1    Apr. 7, 2005

(30) Foreign Application Priority Data
Jan. 22, 2003    (DE) ................. 103 02 262

(51) Int. Cl.
*C01B 35/00*    (2006.01)
(52) U.S. Cl. .................................... 423/287
(58) Field of Classification Search ................. 423/287
See application file for complete search history.

(56) References Cited
U.S. PATENT DOCUMENTS 2,532,217 A * 11/1950 Winternitz ................. 423/287
2,880,058 A * 3/1959 Bronaugh ................... 423/287
2,934,401 A * 4/1960 Hansley et al. ............. 423/287
2,975,027 A * 3/1961 Wittig et al. ................ 423/287
3,215,491 A * 11/1965 Schubert et al. ............ 423/287

FOREIGN PATENT DOCUMENTS

GB      711174    *  6/1954
GB      787771    * 12/1957

OTHER PUBLICATIONS

J. R. Elliott et al., J. Am. Chem. Soc. 74 (1952), 5047-5052.*

* cited by examiner

*Primary Examiner*—Wayne A. Langel
(74) *Attorney, Agent, or Firm*—Fulbright & Jaworski L.L.P.

(57) ABSTRACT

A process for the preparation of lithium borohydride by reaction of lithium hydride with boron trifluoride is described, in which lithium hydride is reacted with boron trifluoride in a molar ratio $LiH:BF_3$ of >4.1:1, the reaction being carried out in an ethereal solvent whose boiling point at normal pressure is at least 50° C., and at temperatures of at least 10° C.

12 Claims, No Drawings

PROCESS FOR THE PREPARATION OF LITHIUM BOROHYDRIDE

This application claims priority from German 103 02 262.7 filed Jan. 22. 2003, which is incorporated by reference in its entirety.

The invention relates to a process for the preparation of lithium borohydride.

A number of different processes have been proposed for the preparation of LiBH$_4$. Direct formation from the elements (that is to say from lithium metal and boron as well as hydrogen) is possible in principle but requires extreme conditions (150 atm. H$_2$ pressure, 650° C.). Such conditions require extraordinarily expensive apparatuses; in addition, elemental boron is not available cheaply.

One possible preparation process starts from boron hydrides MBH$_4$ (M=Na. K) which are available

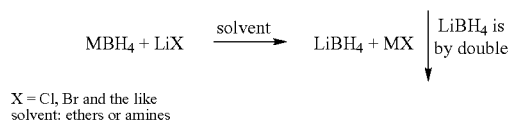

X = Cl, Br and the like
solvent: ethers or amines

The disadvantage of this process is that the rate of substitution is low owing to the insolubility of the secondary product MX, so that complex grinding of the components is generally necessary. Furthermore, it is difficult to separate off M and/or X completely, so that only impure LiBH$_4$ qualities can be obtained.

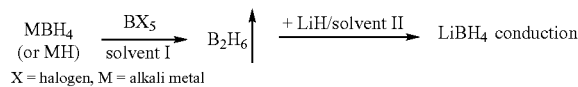

X = halogen, M = alkali metal

The diborane that forms escapes via the gas phase, is optionally purified and is introduced in a second reactor into a suspension of LiH in a solvent (e.g. diethyl ether). This method permits the preparation of pure solutions of LiBH$_4$ in an ethereal solvent. A disadvantage is the production of gaseous diborane as an intermediate. This has extremely high reactivity (spontaneously inflammable in air) and toxicity (MWC 0.1 ppm). The process can therefore be carried out on a commercial scale only if extremely controlled conditions are observed, and complex measures are necessary for monitoring possible diborane emissions and eliminating them in the event of an accident.

In order to avoid this disadvantage, it is possible to choose a process in which diborane reacts further in the same reaction vessel without being isolated, or in which no diborane is formed at all, e.g. the reaction of lithium hydride with boron trifluoride in diethyl ether according to:

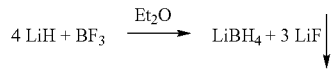

Although this process can result in good yields when the reaction is carried out under pressure, diborane is still formed as an intermediate; diborane is only very sparingly soluble in the diethyl ether, and diborane emissions are therefore still to be expected. Furthermore, the use of diethyl ether as solvent is a problem owing to its high volatility and ready flammability.

For this reason, it is desirable to prepare LiBH$_4$ solutions in a simple manner using solvents which are better to handle, e.g. THF or THF derivatives. Solutions of LiBH$_4$ in THF are known as such, they are generally prepared by dissolving solid LiBH$_4$ in THF.

Although Elliott (J. R. Elliot et al., J. Am. Chem. Soc. 74 (1952), 5047 to 5052) maintains that LiBH$_4$ solutions could also be prepared directly by reacting LiH with BF$_3$ in THF, no concrete information is given, such as, for example, relating to the course of the reaction, yields or product purity. The experiments described in the experimental part (page 5050, Table II) are carried out in a molar ratio LiH:BF$_3$=from 2 to 3.7:1 and exhibit relatively poor yields of diborane. No mention is made of the formation and yields of LiBH$_4$.

Fedneva (E. M. Fedneva, Russian J. Inorg. Chem. 4 (1959) 124 to 125) studied the reaction between LiH and BF$_3$ in the molar ratio of 4:1 at about 0° C. Owing to the comparatively good solubility of LiF, a large amount of LiBF$_4$ is formed, while virtually no lithium borohydride at all is formed. Fedneva concludes that lithium borohydride could not be formed in the first step, as maintained by Elliott, and accordingly also could not be isolated, but that B$_2$H$_6$ is formed first and is able to react with LiH in a subsequent step to form lithium borohydride.

The object of the invention is to overcome the disadvantages of the prior art and, in particular, to provide a process for the preparation of a pure LiBH$_4$ solution using a non-toxic solvent that is easy to handle, which process can be carried out in simple apparatuses under conventional reaction conditions and, where possible, avoiding a diborane intermediate stage.

The object is achieved by reacting lithium hydride with boron trifluoride in a molar ratio LiH:BF$_3$>4.1:1, the reaction being carried out in an ethereal solvent whose boiling point at normal pressure is at least 50° C., at temperatures of at least 10° C.

Surprisingly, it has been found that, under such conditions, lithium borohydride is formed in a very good yield ($\geq$90%, based on BF$_3$) and with very high purity (>95%) and, if suitable conditions are observed, no diborane emissions occur. Moreover, the resulting product solutions are completely free of fluoride; in particular, no lithium borofluoride is formed.

The lithium hydride is preferably used in finely divided form, e.g. in the form of a powder. The mean particle size d$_{50}$ is preferably not more than 0.5 mm, particularly preferably not more than 0.2 mm. A ground and sieved material, as supplied, for example, by Chemetall, is highly suitable.

The molar ratio LiH:BF$_3$ is preferably >4.2:1, particularly preferably >4.4:1. It is preferably the active content of the LiH used that is determined, in order not to include impurities when determining the amount to be used. This means that the molar ratio LiH:BF$_3$ relates to the amount of pure lithium hydride.

There are preferably used as solvents those ethereal solvents which readily dissolve lithium borohydride and diborane. The escape of gaseous emissions is thereby prevented by complex formation. Preference is given to 5- or 6-membered cyclic ethers, such as tetrahydrofuran (THF), 2-methyltetrahydrofuran and tetrahydropyran, or polyfunctional ethers, such as 1,2-dimethoxyethane or 1,2-diethoxyethane. THF is particularly preferred. The ethereal solvents can be used in pure form or in a mixture. Co-solvents may optionally also be used. Hydrocarbons may be used as co-solvents. The proportion of co-solvent (e.g. toluene, ethylbenzene, hexane, heptane) in the solvent mixture is not more than 50 wt. %.

The reaction temperature may be between 10° C. and the boiling point of the solvent or solvent mixture. The reaction temperature is preferably at least 20° C.; the reaction temperature is very particularly preferably between 30 and 70° C. The reaction is preferably carried out at normal pressure or at a slight excess pressure of up to 100 mbar. This slight excess pressure serves merely to ensure an inert gas atmosphere.

The process is preferably carried out in "semi-batch" operation. That is to say, in contrast to "full-batch" operation in which all the raw materials are introduced at once and then the reaction takes place (e.g. also under pressure), one reactant (LiH) is introduced into a vessel and the further reaction component ($BF_3$) is metered in. As a result, the reaction can be controlled in a targeted manner and unstable conditions can be avoided.

The process according to the invention can be carried out, for example, as follows:

The lithium hydride (preferably in powder form) is first suspended in the anhydrous ethereal solvent or solvent mixture under inert gas. Boron trifluoride is then metered in either in gaseous form or in the form of a solution in the solvent used for suspending the LiH. The metering time—depending on the scale of the reaction, the activity (that is to say the active surface area) of the lithium hydride and cooling possibilities—may be approximately between 0.5 and 15 hours, preferably from 1 to 10 hours.

The exothermic reaction between lithium hydride and boron trifluoride sometimes starts only after a delay. That can be avoided by introducing a relatively small amount of lithium borohydride into the vessel before the $BF_3$ is metered in. Preferably, the lithium borohydride can be introduced in an amount of from 0.5 to 10 mol. % of the amount of boron trifluoride added later, an amount of from 3 to 5 mol. % being particularly preferred. The start of the reaction is recognisable by a rise in the internal temperature. The beginning and progress of the reaction can also be detected by conductivity measurements.

When the addition of boron trifluoride is complete, stirring is carried out until no more heat of reaction is liberated or until the conductivity has reached a constant value. The time required therefor is dependent on the specific reaction conditions (LiH excess, particle size distribution, temperature). In general, under particularly preferred conditions, that is to say with a LiH excess of at least 5 or 10 mol. % and with internal temperatures of between 30 and 70° C., a stirring time of from one to three hours is sufficient. When THF is used as solvent, the reaction temperature may very particularly preferably be between 40 and 65° C.

When the reaction is complete, filtration is carried out; the solid filtration residues are washed with the solvent, optionally in admixture with the co-solvent. The $LiBH_4$ is present in the filtrate in dissolved form and in a very pure state (to be demonstrated by $^{11}B$-NMR spectroscopy).

The lithium borohydride solution can be used as a reducing agent for organic synthesis (e.g. reduction of ester functions) or as a source of gaseous hydrogen (e.g. for supplying fuel cells).

The invention is explained in greater detail below with reference to examples.

EXAMPLE 1

Synthesis of $LiBH_4$ in THF, $LiH:BF_3$ Ratio=4.73:1

42.4 g (5.34 mol.) of ground lithium hydride in 300 g of THF were placed in a dried 0.5-litre double-walled reactor rendered inert with argon and equipped with a reflux condenser, a thermocouple, a conductivity-measuring probe, a dropping funnel and a gas washer (filled with 145 g of acetone). After addition of 1.1 g of solid lithium borohydride, the internal temperature was raised to 53° C. and metering of $BF_3$.THF complex (158.1 g=1.13 mol. in total) was begun. The reaction began almost without delay, recognisable by the sudden rise in the internal temperature from 53° C. to 59° C. in the course of 5 minutes and the increase in conductivity from 0.03 mS/cm to 0.10 mS/cm. For better heat dissipation, the jacket temperature was adjusted downwards to 45° C. The $BF_3$.THF was added in the course of 90 minutes.

When the addition was complete, the internal temperature and the jacket temperature equalised within a period of 20 minutes. Boiling under reflux was carried out for a further 90 minutes in order to complete the reaction.

The reaction mixture was cooled to room temperature and then clarified by filtration by means of a glass frit. The filter cake was washed twice with 100 ml of THF.

390 g of a clear, colourless solution were obtained. Analysis revealed 2.70 mmol. of B per g of solution, 2.69 mmol. Li/g, <0.005 mmol. F/g and 10.9 mmol. $H^-$/g. This is 22.9 g of $LiBH_4$ in the form of a 5.9% solution, which corresponds to a yield of 93% of the theoretical yield. In the $^{11}B$-NMR, a signal was to be observed at −41.3 ppm (99% of the total areas, main signal of $LiBH_4$) and a signal was to be observed at −30 ppm (about 0.5% of the total areas, traces of a secondary product).

No boron (<0.005 mmol./g) was detectable in the gas washer filled with THF.

COMPARATIVE EXAMPLE A

Synthesis of $LiBH_4$ in THF, $LiH:BF_3$ Ratio=4.08:1

35.7 g (4.49 mol.) of ground lithium hydride in 300 g of THF were placed in the same apparatus as in Example 1. After addition of 1.1 g of solid lithium borohydride, 153.9 g (1.10 mol.) of $BF_3$.THF complex were added in the course of 110 minutes at internal temperatures of between 45° C. and 60° C. When the addition was complete, the mixture was refluxed for 1.5 hours. Vigorous evolution of a gas occurred, which was passed through the gas washer.

After cooling, filtration was carried out, followed by washing with 4 portions of THF. 422 g of a clear, colourless solution were obtained. Analysis revealed 1.59 mmol. of B per g of solution, 1.21 mmol. Li/g, 0.01 mmol. F/g and 6.1 mmol. $H^-$/g. In the $^{11}B$-NMR, a broad signal was to be observed at −41.3 ppm (about 68% of the total areas, $LiBH_4$), a broad signal was to be observed at −25 ppm (about 20% of the total areas, $LiB_2H_7$) and a signal was to be observed at −1 ppm (about 10% of the total areas, $BH_3$). The yield of $LiBH_4$ was 46% of the theoretical yield. The product was considerably contaminated with $LiB_2H_7$ and $BH_3$.

A boron concentration of 1.7 mmol./g was found in the gas washer; projected to the total amount of solution (final weight 212 g), this corresponds to a yield of just under 33% lost in the form of diborane.

EXAMPLE 2

Synthesis of LiBH$_4$ in 1,2-dimethoxyethane, LiH:BF$_3$ Ratio=4.90:1

In the apparatus described in Example 1, 25.4 g (3.19 mmol.) of ground lithium hydride and 0.78 g of solid lithium borohydride were suspended in 267 g of anhydrous 1,2-dimethoxyethane. At internal temperatures of between 47 and 52° C., 92.3 g (0.65 mol.) of BF$_3$-diethyl ether complex were metered in in the course of 3 hours.

When the addition was complete, stirring was carried out for 4 hours at 50° C.

After cooling to room temperature, the reaction mixture was filtered and the filtration residue was washed 3 times with 40 ml of 1,2-dimethoxyethane each time. 292 g of a clear, colourless solution were obtained. Analysis revealed 1.60 mmol. of B per g of solution, 1.57 mmol. Li/g and 6.39 mmol. H$^-$/g (F not determined). This corresponds to a yield of LiBH$_4$ isolated in the form of the solution of just under 95%.

0.035 mmol./g of boron were found in the waste gas washer filled with 46 g of THF, which corresponds to a yield of 0.2% lost in the form of BH$_3$.

The invention claimed is:

1. A process comprising preparing lithium borohydride by reacting lithium hydride with boron trifluoride in a molar ratio after completion of the reaction, of LiH:BF$_3$>4.1:1 in an ethereal solvent that comprises an ether at a reaction temperature of at least 10° C., wherein the boiling point of the ethereal solvent at normal pressure is at least 50° C.

2. A process according to claim 1, wherein the lithium hydride is a powder having a mean particle size d$_{50}$ of not more than 0.5 mm.

3. A process according to claim 1, wherein the molar ratio LiH:BF$_3$ is >4.2:1.

4. A process according to claim 3, wherein the molar ratio LiH:BF$_3$ is >4.4:1.

5. A process according to claim 1, wherein said ethereal solvent is at least one 5- or 6-membered cyclic monoether or a polyfunctional ether.

6. A process according to claim 5, wherein said ethereal solvent is at least one solvent selected from the group consisting of tetrahydrofuran (THF), 2-methyltetrahydrofuran, tetrahydropyran, 1,2-dimethoxyethane and 1,2-diethoxyethane.

7. A process according to claim 1, further comprising adding at least one co-solvent in a maximum amount of 50 wt. % of the combined weight of the co-solvent and the ethereal solvent.

8. A process according to claim 7, wherein hydrocarbons are used as the co-solvents.

9. A process according to claim 1, wherein the reaction temperature is between 30 and 70° C.

10. A process according to claim 1, wherein the reaction is carried out at normal pressure or at a slight excess pressure of up to 100 mbar.

11. A process according to claim 1, wherein 0.5 to 10 mol % lithium borohydride based on the total amount of boron trifluoride added is added to start the reaction.

12. A process according to claim 2, wherein the molar ratio LiH:BF$_3$ is >4.2:1.

* * * * *